(12) United States Patent
Allen et al.

(10) Patent No.: US 8,395,122 B2
(45) Date of Patent: *Mar. 12, 2013

(54) DETECTION APPARATUS AND METHOD

(75) Inventors: Philip John Allen, Nottingham (GB); Andrew John Gilbert, Kent (GB)

(73) Assignee: Filtrona C&SP Limited, Nottingham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,027

(22) Filed: Nov. 16, 2011

(65) Prior Publication Data

US 2012/0112071 A1 May 10, 2012

Related U.S. Application Data

(63) Continuation of application No. 12/097,485, filed as application No. PCT/GB2006/004723 on Dec. 18, 2006, now Pat. No. 8,076,643.

(30) Foreign Application Priority Data

Dec. 16, 2005 (GB) .................................. 0525665.6

(51) Int. Cl.
*G01J 5/02* (2006.01)

(52) U.S. Cl. ................. 250/339.06; 250/341.1

(58) Field of Classification Search .............. 250/339.06
See application file for complete search history.

(56) References Cited

U.S. PATENT DOCUMENTS

| 3,340,978 A | 9/1967 | Haville |
| 4,202,491 A | 5/1980 | Suzuki |
| 4,533,244 A | 8/1985 | Kaule et al. |
| 6,047,964 A | 4/2000 | Lawandy et al. |
| 6,223,876 B1 | 5/2001 | Walsh et al. |
| 6,549,131 B1 | 4/2003 | Cote et al. |
| 2005/0067489 A1 | 3/2005 | Jones et al. |

FOREIGN PATENT DOCUMENTS

| EP | 0719654 A1 | 7/1996 |
| EP | 1158459 A | 11/2001 |
| EP | 1354919 A1 | 10/2003 |
| GB | 2088920 A | 6/1982 |
| JP | 2002212552 A | 1/2001 |
| WO | 81/03509 A | 12/1981 |

OTHER PUBLICATIONS

International Search Report dated Mar. 27, 2007 (PCT/GB06/04723).
British Search Report dated Apr. 3, 2007 (GB0625173.0).

*Primary Examiner* — Marcus Taningco
(74) *Attorney, Agent, or Firm* — Banner & Witcoff, Ltd.

(57) ABSTRACT

Apparatus for detection of infrared radiation emitted from a taggant following excitation of the taggant sample measures the decay time of the radiation used. If the decay characteristic is accurately measured, the particular taggant can be accurately identified. The apparatus comprises an electronic controller, light-emitting diodes, a photo-detector, a first amplifier, a three-way sampling switch, filter/stores, second amplifiers and an output display. The infrared emission is excited by repeatedly illuminating the taggant for a period of microseconds every few milliseconds. When the light source is turned off, the sample continues radiating for a few milliseconds. The emission is detected by photo-detector sensitive to the 800 to 1000 nm waveband thereby rejecting interference from visible light sources.

18 Claims, 3 Drawing Sheets

DETECTION APPARATUS AND METHOD

CROSS REFERENCE TO RELATED APPLICATION

This is a continuation application of Ser. No. 12/097,485 filed Dec. 18, 2006 entitled "Detection Apparatus and Method" which is a National filing of a corresponding co-pending application filed in the United Kingdom as U.K. Serial No. GB0525665.6, filed Dec. 16, 2005, entitled "Detector and Method of Detection" for which priority is claimed and which are incorporated herein by reference.

BACKGROUND OF THE INVENTION

The present invention relates to a detector and a method for detecting the presence/absence and/or nature of a security mark on an article.

In the field of product or document security it is known to place a machine readable mark on an article or its packaging, which mark can be read by a detector to identify the article and/or to verify the authenticity or otherwise of the article. Such a mark may typically be printed on the article, and may be invisible to the naked eye.

For example, there exist particularly sophisticated, complex inks which reliably emit radiation with certain characteristics under exposure to radiation in a certain frequency range. Such complex inks, which are by their nature difficult for counterfeiters to manufacture include inks known as taggant inks.

A taggant-ink marking on an article will, when exposed to appropriate radiation, exhibit behaviour of a certain signature or characteristic peculiar to that ink. For example, when the ink sample is irradiated by radiation at an "excitation" frequency, the ink sample will emit radiation, at an emission frequency, and will continue to do so after exposure to the excitation radiation has ceased. The emitted radiation after excitation has ceased decays in a known, repeatable manner which is unique to the particular taggant.

One example of taggant material, as used in such complex inks, comprises a base material of lattice structure which includes one or more rare-earth metal dopants. By varying the level of dopant, or the position of dopant molecules within the lattice it is possible to produce a range of taggant materials which exhibit different, but predictable repeatable characteristics when excited by a radiation source.

Typically a detector is used to provide the excitation radiation and then to detect emitted radiation to determine the presence/absence, and in certain cases the signature or characteristic, of ink on the article or its packaging.

The detector must therefore incorporate some form of radiation source, the frequency of which must be known, precise and reliably repeatable, and a detection mechanism which is able to detect the presence of emitted radiation of the appropriate frequency.

Previously considered techniques have many problems. Firstly, since the taggant materials most commonly used emit frequency-shifted radiation in the visible part of the spectrum, ambient light levels can make measurement of the emitted radiation difficult, as can coloured backgrounds or substrates. Furthermore, this type of process produces a low power output—i.e. the emitted radiation is very weak.

SUMMARY OF THE INVENTION

According to one aspect of the present invention there is provided detection apparatus for determining the presence, absence or characteristic of a security ink on a sample, the apparatus comprising: a radiation source for providing excitation radiation to the sample;

a detector for detecting radiation emitted from the sample; and processing means arranged in use to determine the presence, absence or characteristic of ink on the sample according to analysis of the detected radiation emitted from the sample;

wherein the processing means is arranged to measure radiation emitted from the sample, in the same part of the spectrum as the frequency of excitation, following its excitation.

Preferably the processing means is arranged to measure radiation emitted from the sample at substantially the same frequency as the frequency of excitation.

Preferably the processing means is arranged to measure a decay characteristic of said radiation.

The excitation radiation may be in the infrared part of the spectrum.

The invention also provides a method of determining the presence, absence or characteristic of security ink on a sample, the method comprising:

irradiating the sample with excitation radiation;

detecting radiation emitted from the sample; and processing an electronic signal derived from the detected radiation;

wherein the step of processing includes measuring radiation emitted from the sample, in the same part of the spectrum as the frequency of excitation, following its excitation.

Preferably the step of processing comprises measuring radiation emitted from the sample at substantially the same frequency as that of the excitation radiation.

Preferably the step of processing includes measuring a decay characteristic of said radiation.

The excitation radiation may be in the infrared part of the spectrum.

BRIEF DESCRIPTION OF THE DRAWINGS

A preferred embodiment of the present invention will now be described, by way of example only, with reference to the accompanying drawings, in which.

DESCRIPTION OF EMBODIMENTS OF THE INVENTION

The technique for detection used in embodiments of the present invention relies upon the measurement of the decay time of infrared radiation emitted from a taggant material sample following the excitation of the sample. The decay time is a function of the particular taggant being used and so, if the decay characteristic or signature is accurately measured, the particular taggant can be accurately identified.

Figure 1:
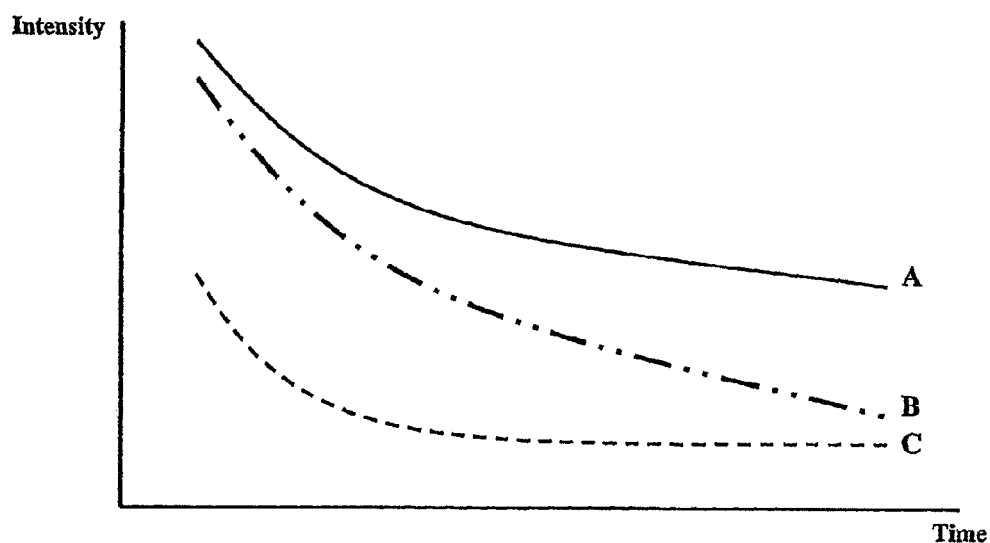
FIG. 1 shows a graph of emitted radiation against time following illumination of various samples of security ink.

FIG. 1 illustrates typical outputs from various taggants (A-C) that have been excited by a short burst of high intensity infrared light. Whilst the shape of each decay response is fixed for a particular taggant type, the absolute values that are measured vary over a wide range, dependent on material density, the size of the sample, the substrate material, the proximity of the detector and the strength of the illumination.

Figure 2:
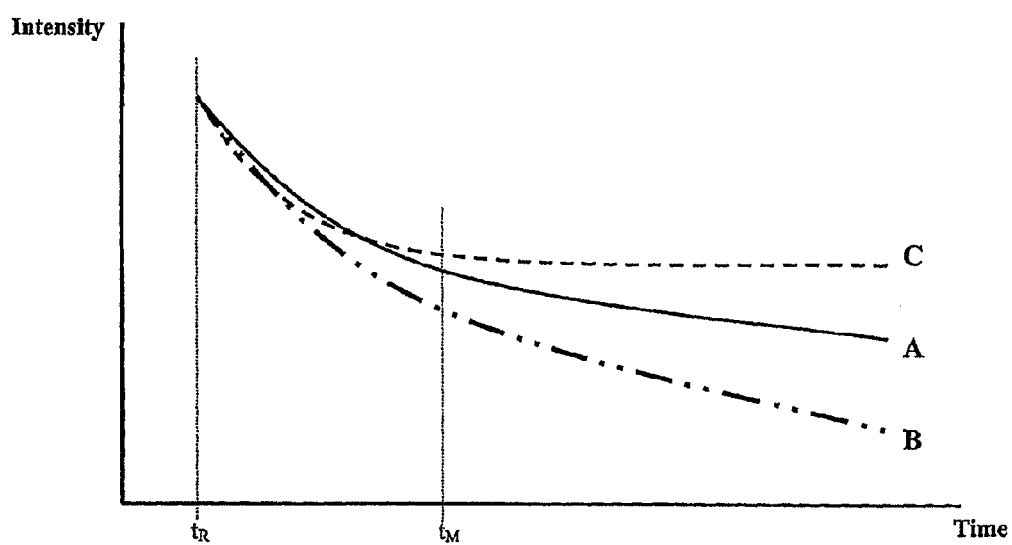
FIG. 2 shows a graph in which the measurements of the graph of FIG. 1 have been standardised.

However, if the first sample from each taggant is taken as a REFERENCE point and then each of the plots is standardised to have the same initial value, the result shown in FIG. 2 is obtained.

It is apparent from FIG. 2 that the taggant samples can be distinguished by measuring values of intensity of emitted radiation at a time $t_M$ occurring after the REFERENCE time $t_R$.

Figure 3:
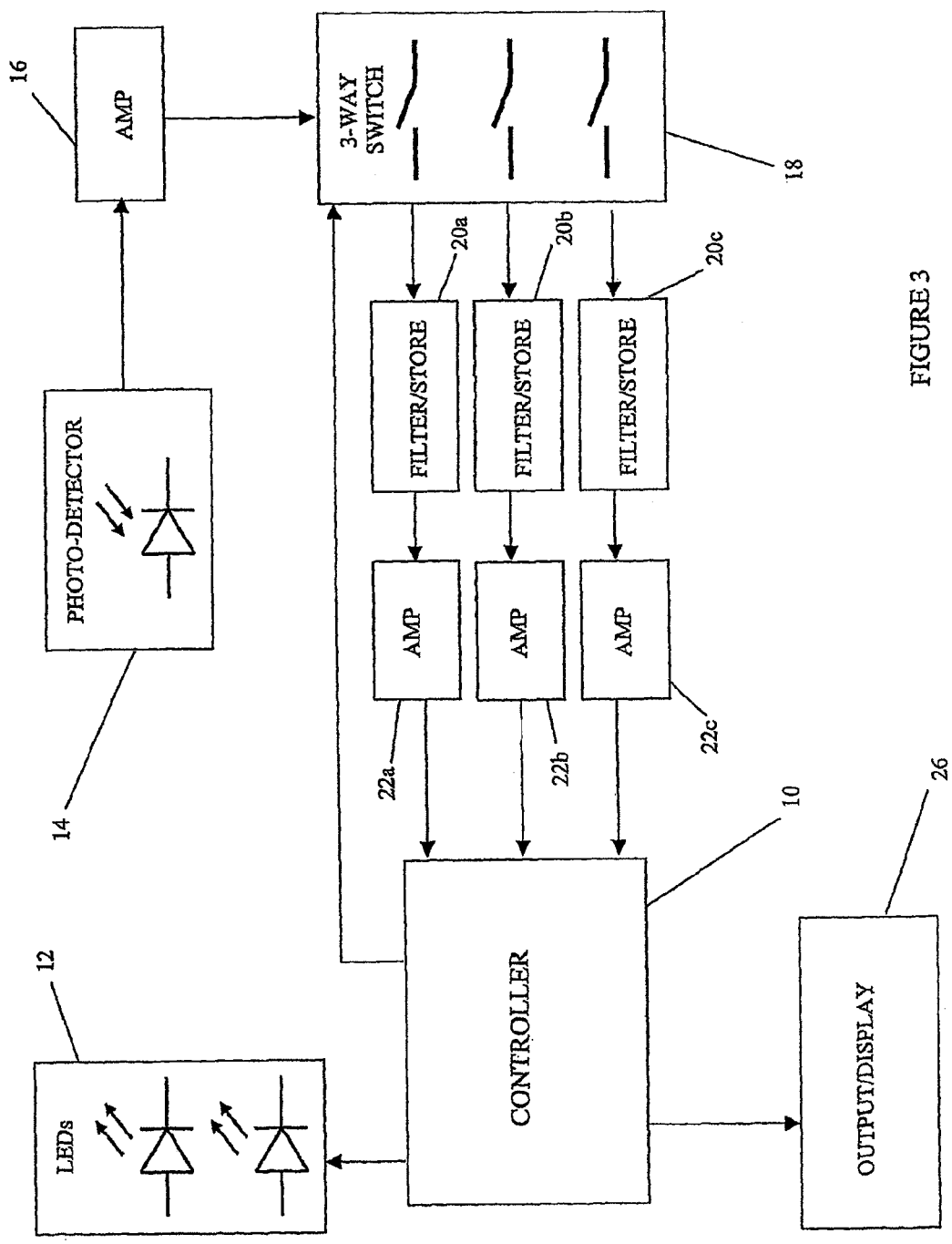
FIG. 3 is a schematic circuit diagram of an embodiment of detection apparatus in accordance with the invention; and, FIG. 4 shows the sequence of sampling events.

FIG. 3 shows schematically the structure of the detector apparatus, according to an embodiment of the present invention.

The apparatus comprises an electronic controller 10, a pair 12 of illuminating light-emitting diodes, a photo-detector 14, a first amplifier 16, a three-way sampling switch 18, filter/stores 20 (a-c), second amplifiers 22 (a-c) and an output display 26.

In the detector according to this embodiment, the infrared emission is excited by repeatedly illuminating the material for a period of microseconds every few milliseconds using a very intense source of infrared light. This light is supplied by the pair of 940 nm, light-emitting diodes 12. Once this light source has been turned off, the sample continues radiating infrared light for a few milliseconds.

The emission is detected by photo-detector 14 that is only sensitive to infrared light in the 800 to 1000 nm waveband. This helps to reject interference from visible light sources.

The signal is then amplified by amplifier 16 and fed to a 3-way analogue switch 18 that allows the signal amplitude to be sampled at various time intervals after the illumination event.

Figure 4:
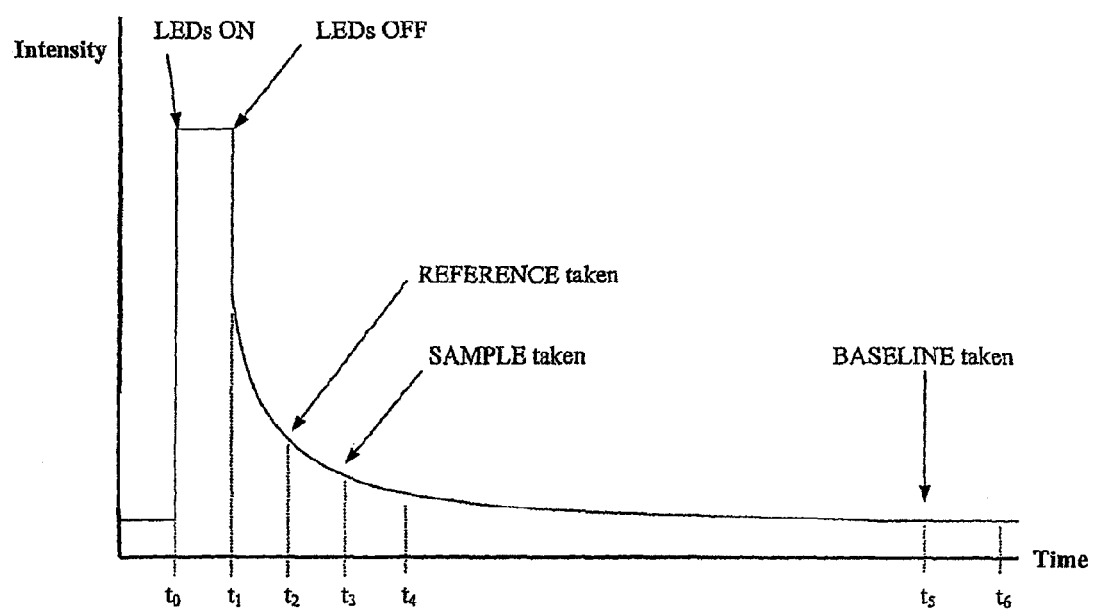

Referring to FIG. 4, the sequence of events is as follows:
1. $t_0$—The illuminating LEDs are turned on.
2. $t_1$—The illuminating LEDs are turned off.
3. $t_2$—A reading is taken by closing a first one of the analogue switches 18. This gives a REFERENCE reading that is used as both a first measurement point and to control the amplitude of illumination (as described below).
4. $t_3$—The first analogue switch 18 is opened and a second one of the switches 18 is closed. This gives the SAMPLE reading that is used to determine the decay rate.
5. $t_4$—The second analogue switch 18 is opened.
6. $t_5$—The third analogue switch 18 is closed. This gives a BASELINE reading that indicates the level of illumination that is detected once the afterglow from the material has fully decayed. This is used to compensate for background illumination sources and any DC offsets present in the photo-detector 14.
7. $t_6$—The third analogue switch 18 is opened.

Times $t_0$ to $t_6$ are of the order of hundreds of microseconds.

The values of the readings taken for REFERENCE, SAMPLE AND BASELINE are stored between subsequent sampling events by way of filter/stores 20 (a-c).

The resultant readings are further amplified by amplifiers 22 (a-c) before being fed to analogue inputs of the controller 10 where they are converted into digital values.

To obtain a value relating to the emission characteristic of the material, the readings for the REFERENCE and SAMPLE intervals are ratioed. This ratio is used to identify a specific material decay response and hence the material itself.

The signal amplitude of the emitted radiation can vary over a large range that is typically more than 10000 to 1. This means that the strongest signals can overload the detection electronics whereas the very weakest ones could be hidden amongst noise from other light sources such as fluorescent and tungsten lighting.

To accommodate this wide dynamic range, the apparatus adjusts the intensity of the infrared light source depending on the strength of the received signal.

Since the infrared content of ambient light sources such as daylight or main lighting will add an offset to the values detected, the third BASELINE measurement is used along with a servo, not shown, to inject a current into the front end of the circuit which balances any offset signal and returns the decay graph baseline to a known constant value.

The BASELINE value is subtracted from the other readings by the controller before calculating the decay characteristic ratio.

Since the detector 14 is subjected to large intensity infrared signals during the illumination period, a transistor (not shown) is used to clamp the detector signal at this time, so that overload of the detector and the first amplifier 16 is reduced and circuit recovery time is reduced.

The device is preferably powered from a battery (not shown).

While an embodiment of the invention has been described, the invention is to be limited only by the following claims and equivalents thereof.

What is claimed is:

1. A detector for authenticating an article provided with a taggant security mark, comprising:
   a radiation source for irradiating the taggant with a pulse of excitation radiation so as to cause the taggant to emit luminescent radiation that decays with time, wherein in use the taggant is repeatedly irradiated;
   a radiation detector for detecting the luminescent radiation emitted from the taggant;
   a storage means for storing a reference reading and a decay reading of the luminescent radiation emitted from the taggant after each pulse of excitation radiation;
   a controller for ratioing the reference reading and the decay reading to generate decay ratio data;
   a radiation source adjustment means for adjusting the intensity of the excitation radiation emitted by the radiation source depending on previously measured ratio data; and
   authentication means for authenticating the article by referencing the ratio data generated.

2. A detector according to claim 1, wherein the radiation source comprises an infra-red radiation source.

3. A detector according to claim 2, wherein the infra-red radiation source comprises one or more light-emitting diodes.

4. A detector according to claim 1, wherein the radiation detector comprises one or more photo-detectors.

5. A detector according to claim 1, wherein the radiation detector is sensitive to infra-red light in the 800-1000 nm waveband.

6. A detector according to claim 1, wherein the storage means comprises an individual store for each reading.

7. A detector according to claim 6, wherein the storage means comprises a reference store and a decay store.

8. A detector according to claim 1, wherein the storage means is also for storing a baseline reading of the luminescent radiation emitted from the taggant.

9. A detector according to claim 8, wherein the storage means comprises a baseline store.

10. A method of authenticating an article provided with a taggant security mark, comprising:
    repeatedly irradiating the taggant with a pulse of excitation radiation so as to cause the taggant to emit luminescent radiation that decays with time;
    detecting the luminescent radiation emitted from the taggant;

storing a reference reading and a decay reading of the luminescent radiation emitted from the taggant after each pulse of excitation radiation;

ratioing the reference reading and the decay reading to generate decay ratio data;

adjusting the intensity of the excitation radiation emitted by the radiation source depending on previously measured ratio data; and authenticating the article by referencing the ratio data generated.

11. A method according to claim 10, wherein the taggant is irradiated with pulses of infra-red excitation radiation.

12. A method according to claim 11, wherein the excitation radiation is emitted from one or more light-emitting diodes.

13. A method according to claim 10, wherein the luminescent radiation is detected by one or more photo-detectors.

14. A method according to claim 10, wherein the excitation radiation is emitted in the 800-1000 nm waveband.

15. A method according to claim 10, wherein the readings of the luminescent radiation are stored in individual stores.

16. A method according to claim 15, wherein the reference reading is stored in a reference store and wherein the decay reading is stored in a decay store.

17. A method according to claim 10, further comprising storing a baseline reading of the luminescent radiation emitted from the taggant.

18. A method according to claim 17, wherein the baseline reading is stored in a baseline store.

* * * * *